United States Patent
Merkel et al.

(10) Patent No.: US 9,505,441 B2
(45) Date of Patent: Nov. 29, 2016

(54) SUPPORTING FRAME FOR A MOTOR VEHICLE

(71) Applicant: Dr. Ing. h.c. F. Porsche Aktiengesellschaft, Stuttgart (DE)

(72) Inventors: Timo Fabian Merkel, Weissach (DE); Volker Peitz, Vaihinge/Riet (DE); Julian Schoepfer, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/310,431

(22) Filed: Jun. 20, 2014

(65) Prior Publication Data

US 2014/0374176 A1 Dec. 25, 2014

(30) Foreign Application Priority Data

Jun. 20, 2013 (DE) .................. 10 2013 106 433

(51) Int. Cl.
| | |
|---|---|
| *B62D 21/15* | (2006.01) |
| *B60K 1/00* | (2006.01) |
| *B62D 25/08* | (2006.01) |
| *B60K 1/04* | (2006.01) |

(52) U.S. Cl.
CPC .............. *B62D 21/155* (2013.01); *B60K 1/00* (2013.01); *B60K 1/04* (2013.01); *B62D 25/082* (2013.01); *B60K 2001/0411* (2013.01); *B60Y 2306/01* (2013.01)

(58) Field of Classification Search
CPC ..... B62D 21/155; B62D 25/082; B60K 1/00
USPC ....................... 180/65.1, 69.1, 271, 299, 291; 296/187.09
See application file for complete search history.

(56) References Cited

U.S. PATENT DOCUMENTS

| | | | | |
|---|---|---|---|---|
| 2,667,231 A | * | 1/1954 | MacPherson | .................. 180/291 |
| 3,819,224 A | * | 6/1974 | Casey | .................. B62D 21/152 188/377 |
| 4,440,435 A | * | 4/1984 | Norlin | .................. B62D 25/082 280/784 |

(Continued)

FOREIGN PATENT DOCUMENTS

| | | |
|---|---|---|
| DE | 19858639 | 6/2000 |
| DE | 10154026 | 5/2003 |

(Continued)

OTHER PUBLICATIONS

German Search Report dated Jan. 28, 2014.

(Continued)

*Primary Examiner* — J. Allen Shriver, II
*Assistant Examiner* — Brian Cassidy
(74) *Attorney, Agent, or Firm* — Gerald E. Hespos; Michael J. Porco; Matthew T. Hespos

(57) ABSTRACT

A supporting frame for a motor vehicle has two parallel longitudinal members oriented in the longitudinal direction of the motor vehicle and form part of the body. Two longitudinal struts are oriented at least partially in the longitudinal direction and are fixed at first ends to a contact section of the longitudinal members. The longitudinal struts are connected at a second end opposite the first end to an impact plate that is arranged on at least one driving component of the motor vehicle to form a load path between the contact section of the longitudinal members and the at least one driving component.

13 Claims, 2 Drawing Sheets

(56) References Cited

U.S. PATENT DOCUMENTS

| | | | | |
|---|---|---|---|---|
| 4,750,780 | A * | 6/1988 | Harasaki | B62D 25/081 296/192 |
| 5,611,568 | A * | 3/1997 | Masuda | B60R 21/0136 280/784 |
| 5,992,921 | A | 11/1999 | Seki | |
| 6,170,906 | B1 * | 1/2001 | Kasuga | B62D 29/008 296/203.02 |
| 6,447,049 | B1 * | 9/2002 | Tohda | B60R 19/12 293/117 |
| 6,899,195 | B2 * | 5/2005 | Miyasaka | B62D 21/155 180/312 |
| 7,296,824 | B2 * | 11/2007 | Yasui | B62D 21/152 280/784 |
| 7,632,203 | B2 * | 12/2009 | Miller | B60K 6/36 475/149 |
| 7,695,008 | B2 * | 4/2010 | Kuze | B60R 21/01 280/735 |
| 7,699,346 | B2 * | 4/2010 | Wehner | B62D 21/152 280/784 |
| 7,766,420 | B2 * | 8/2010 | Maruyama | B62D 21/152 296/192 |
| 7,810,878 | B2 * | 10/2010 | Nakamura | B62D 21/11 296/203.02 |
| 7,845,716 | B2 * | 12/2010 | Kiyotake | B62D 21/152 296/203.02 |
| 8,037,960 | B2 * | 10/2011 | Kiya | 180/68.5 |
| 8,100,444 | B2 * | 1/2012 | Erzgraber | B60R 19/18 293/115 |
| 8,371,628 | B2 * | 2/2013 | Choi | B60R 19/34 293/132 |
| 8,459,728 | B2 * | 6/2013 | Fujii | B62D 25/082 296/187.09 |
| 8,480,130 | B2 * | 7/2013 | Dandekar | B62D 21/11 280/784 |
| 8,485,592 | B2 * | 7/2013 | Shin | B62D 21/152 293/149 |
| 8,646,790 | B2 * | 2/2014 | Young | B62D 21/155 280/124.109 |
| 8,657,365 | B2 * | 2/2014 | Amano | B60K 1/00 296/187.11 |
| 8,720,983 | B1 * | 5/2014 | Edwards | B62D 21/152 296/187.09 |
| 8,739,910 | B2 * | 6/2014 | Katayama | B62D 21/152 180/311 |
| 8,882,184 | B2 * | 11/2014 | Naito | B62D 25/082 296/203.02 |
| 2003/0080587 | A1 | 5/2003 | Kitagawa | |
| 2006/0091700 | A1 | 5/2006 | Decker et al. | |
| 2008/0150326 | A1 * | 6/2008 | Maruyama | B62D 25/082 296/192 |
| 2008/0238150 | A1 * | 10/2008 | Nakamura | B62D 21/11 296/203.02 |
| 2011/0316295 | A1 * | 12/2011 | Yamada et al. | 293/132 |
| 2012/0048638 | A1 * | 3/2012 | Kim et al. | 180/292 |
| 2012/0049799 | A1 * | 3/2012 | Terashima | B60K 1/04 320/109 |
| 2012/0248820 | A1 * | 10/2012 | Yasui | B60R 19/34 296/187.09 |
| 2012/0261952 | A1 * | 10/2012 | Mildner et al. | 296/203.02 |
| 2013/0113238 | A1 * | 5/2013 | Mildner | B62D 25/082 296/204 |
| 2014/0291053 | A1 * | 10/2014 | Nagasawa et al. | 180/271 |
| 2014/0312652 | A1 * | 10/2014 | Favaloro | B62D 25/082 296/187.1 |

FOREIGN PATENT DOCUMENTS

| | | |
|---|---|---|
| DE | 10332377 | 7/2004 |
| DE | 102006011782 | 4/2007 |
| DE | 102006041112 | 3/2008 |
| DE | 102011010365 | 8/2012 |
| DE | 102011078029 | 10/2012 |
| JP | H07246842 | 9/1995 |
| JP | 2000-92624 | 3/2000 |
| JP | 2002331965 | 11/2002 |
| JP | 2003127893 | 5/2003 |
| JP | 2009193942 | 8/2009 |
| JP | 2010083393 | 4/2010 |

OTHER PUBLICATIONS

Japanese Patent Publ. No. 2014-122975—Office Action issued May 27, 2015.

* cited by examiner

SUPPORTING FRAME FOR A MOTOR VEHICLE

CROSS REFERENCE TO RELATED APPLICATION

This application claims priority under 35 USC 119 to German Patent Appl. No. 10 2013 106 433.7 filed on Jun. 20, 2013, the entire disclosure of which is incorporated herein by reference.

BACKGROUND

1. Field of the Invention

The invention relates to a supporting frame for a motor vehicle comprising two parallel longitudinal members oriented in the longitudinal direction of the motor vehicle and forming part of the body, and two longitudinal struts at least partially oriented in the longitudinal direction and fixed respectively at a first end to a contact section of the longitudinal members. The invention also relates to a motor vehicle with an electric machine for providing driving power and an electric energy accumulator for providing electrical energy for driving the electric machine 2. Description of the Related Art Supporting frames function to stiffen the body of the motor vehicle and to support driving components of the motor vehicle.

The body of a motor vehicle that is driven by a conventional internal combustion engine is stiffened in the region of the driving motor by the outer frame body and by the internal combustion engine arranged in the frame body. The rigidity of the body in this region is achieved by the internal combustion engine, the transmission and the vehicle tunnel that is connected to the transmission to form a block. A motor vehicle that is driven solely electrically has no internal combustion engine and no variable speed transmission to form a block that contributes to stiffening. Therefore additional stiffening is required in the region of the electric drive to ensure the corresponding passive safety.

EP 2 353 971 A1 proposes arranging an additional stiffening element upstream of a traction battery that is mounted on a supporting frame of the motor vehicle to stiffen the vehicle body of an electrically driven motor vehicle. The stiffening element connects longitudinal members of the supporting frame to one another. However, this structure disadvantageously increases the weight of the body and does not form a block.

DE 10 2010 018 729 A1 discloses a crumple zone of a passenger vehicle to provide an additional stiffening element. A front region has a cross member and stiffening struts run diagonally for connecting the cross member to the vehicle body to form a load path that runs obliquely in the vehicle body. However, the additional stiffening element is complicated technically and increases the weight of the vehicle body.

An object of the invention is to provide a supporting frame for an electrically driven motor vehicle that increases the stability of the vehicle body with little technical complexity and little mass.

SUMMARY OF THE INVENTION

The invention relates to a supporting frame with longitudinal struts connected at a second end opposite the first end to an impact plate that is arranged on at least one driving component of the motor vehicle to form a load path between the contact section of the longitudinal members and the at least one driving component.

The invention also relates to a motor vehicle with an electric machine for providing driving power, an electric energy accumulator for providing electrical energy for driving the electric machine, and the above-described supporting frame for the body of the motor vehicle.

The longitudinal members of the vehicle body are connected to the impact plate via the longitudinal struts, and the impact plate is arranged on a driving component of the motor vehicle to form a load path. The longitudinal members and the vehicle component can form a block via the additional longitudinal struts. Therefore, with little technical complexity, the existing driving component can be used for stiffening the vehicle. As a result, a stiff body can be achieved with little technical complexity.

The impact plate preferably is a two-dimensional element with a surface of the impact plate extending substantially perpendicular to the longitudinal direction. As a result, in the event of an impact of the motor vehicle, the impact energy is transmitted optimally in the longitudinal direction to the driving component.

The longitudinal struts preferably are connected to each other by at least one cross member that extends obliquely or perpendicularly to the longitudinal direction. As a result, further stiffening of the longitudinal struts can be achieved and at the same time buckling of the longitudinal struts toward the vehicle interior can be avoided.

The impact plate preferably is arranged between an electric driving unit and a traction battery of the motor vehicle. As a result, the impact plate can be fit and integrated into the motor vehicle with little technically complexity.

The respective second end of each longitudinal strut preferably has a rib structure that is supported on the impact plate. Thus, the rigidity of the longitudinal struts in the region of the impact plate can be increased further with a low consumption of material and a low overall weight.

The traction battery preferably is accommodated in a battery housing that is fixed to the vehicle body. As a result, a block is formed by the vehicle battery and the battery housing, thereby increasing the structural integrity of the body.

The impact plate preferably is supported on the traction battery or on the battery housing. Thus, the traction battery or the battery housing can contribute to forming a block via the longitudinal struts and can absorb the impact energy of the motor vehicle via the longitudinal struts.

The traction battery preferably has a plurality of battery modules and a longitudinally extending stiffening element is arranged between the battery modules. Thus, the structural rigidity of the traction battery is increased, and a block is formed with the traction battery.

The stiffening element preferably is a horizontal intermediate plane in the battery housing. As a result, the rigidity of the battery housing can be increased further in the longitudinal direction for the impact plate.

Two stiffening struts preferably connect the longitudinal members to a chassis of the motor vehicle and extend oblique to the longitudinal direction. As a result, structural integrity and rigidity of the longitudinal members can be increased.

The stiffening struts preferably are fixed to the first end of the longitudinal members and are connected to each other in a V-shaped manner. Additionally, the two stiffening struts are fixed at a common contact point to a section of the chassis to form a load travel between the respective first end of the longitudinal members and the vehicle. As a result, impact energy can be transmitted to the chassis with simple means.

The stiffening struts preferably form a V-shaped stiffening element that is designed to be open in the longitudinal direction toward the first ends of the longitudinal members. As a result, even in the case of offset accident situations, the impact energy can be conducted away via the oblique load path toward a center of the motor vehicle.

The electric driving components of the motor vehicle of the invention are connected to the longitudinal members of the vehicle body via the longitudinal struts. Therefore, the electric driving components form a block that significantly increases the structural integrity of the motor vehicle body in the region of the driving components despite the lack of a block formed by an internal combustion engine.

The features mentioned above and those explained below can be used in the respectively stated combination, and in different combinations or on their own without departing from the scope of the invention.

Exemplary embodiments of the invention are illustrated in the drawings and are explained in more detail in the description below.

DETAILED DESCRIPTION OF THE PREFERRED EMBODIMENTS

Figure 1:
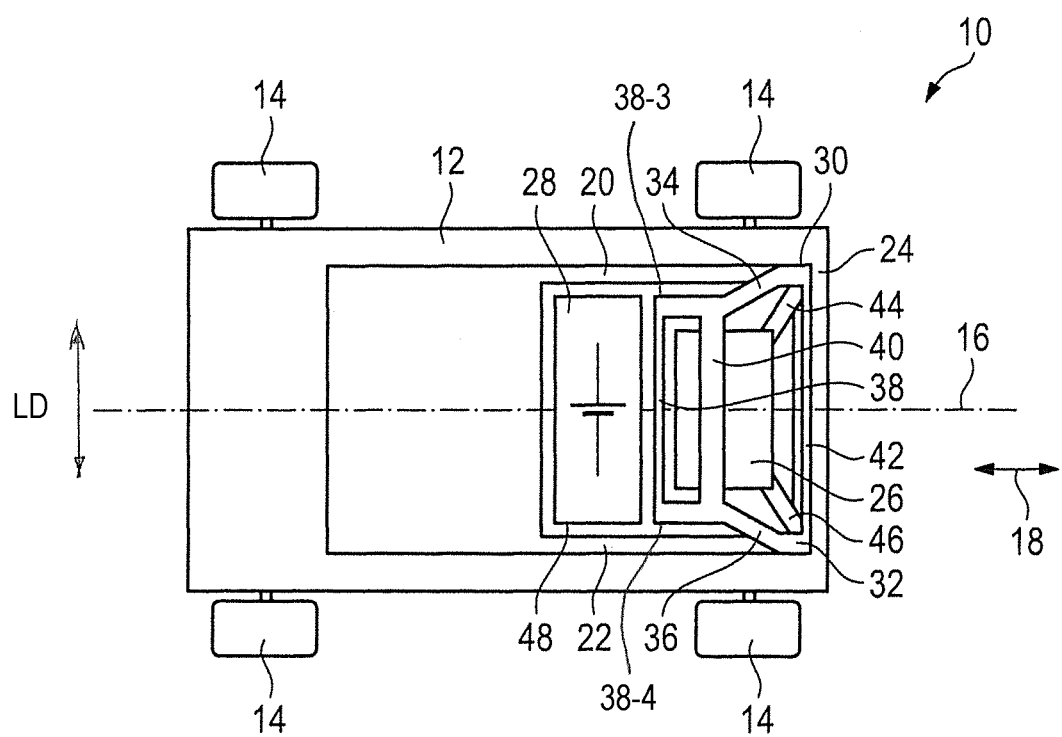
FIG. 1 is a schematic illustration of a supporting frame of a motor vehicle with longitudinal members and longitudinal struts connected thereto.

An electrically driven motor vehicle in accordance with the invention is identified by the numeral 10 in FIG. 1. The motor vehicle 10 has a supporting frame 12 that forms a body 12 of the motor vehicle 10. Wheels 14 of the motor vehicle 10 are mounted on the supporting frame 12 via a chassis (not illustrated specifically). The motor vehicle 10 generally has a longitudinal axis 16 and moves substantially in the longitudinal direction parallel to the longitudinal axis 16, as indicated by an arrow 18.

The vehicle body 12 includes two longitudinal members 20, 22 are formed on the supporting frame 12 and extend parallel to the longitudinal axis 16. The longitudinal members 20, 22 form a frame structure that is open toward one vehicle end 24 and is substantially U-shaped. An electric machine 26 for providing driving power and a traction battery 28 for providing electrical energy for the electric machine 26 are mounted on the supporting frame 12. The electric machine 26 and the traction battery 28 are mounted one behind the other in the longitudinal direction 16, with the electric machine 26 arranged in an outer region and the traction battery 28 arranged in an inner region.

Longitudinal struts 34, 36 extend at least partially in the longitudinal direction 16 and are fixed respectively to outer ends 30, 32 of the longitudinal members 20, 22. The longitudinal struts 34, 36 are fixed at first ends to the outer ends 30, 32 of the longitudinal members 20, 22 and are connected at opposite ends to an impact plate 38. The impact plate 38 is arranged on the traction battery 28, and therefore a load path is formed between the outer ends 30, 32 and the traction battery 28. The impact plate 38 is flat and has first and second major surfaces 38-1 and 38-2 that extends substantially orthogonally to the longitudinal axis 16. The first and second major surfaces 38-1 and 38-2 are spaced apart from one another by a thickness dimension "t" as shown in FIG. 3. The impact plate 38 shown in the figures also has opposite lateral side edges 38-3 and 38-4 that are spaced apart in a lateral direction LD of the vehicle 10 to define a width for the impact plate 38 and opposite top and bottom edges 38T and 38B that are spaced apart in a vertical direction VD to define a height for the impact plate 38. The height and the width are much greater than the thickness t, as shown in each of FIGS. 1-3. Thus, in the event of an impact of the motor vehicle 10, the impact plate 38 can be supported substantially two-dimensionally on the traction battery 28 at the outer ends 30, 32 and thereby stiffens the longitudinal members 20, 22 and relieves the longitudinal members 20, 22 of load. The electric machine 26 is on a side of the impact plate 38 opposite the traction battery 28.

The longitudinal struts 34, 36 are connected to each other by a crossmember 40 to avoid buckling of the longitudinal struts 34, 36 in the event of an impact of the motor vehicle 10 and to reinforce the longitudinal struts 34, 36.

A further crossmember 42 is mounted at the outer ends 30, 32 and connects the longitudinal struts 34, 36 and the longitudinal members 20, 22 to one another. The outer ends 30, 32 also are connected respectively to stiffening struts 44, 46. The stiffening struts 44, 46 are oblique to the longitudinal axis 16 and extend toward the vehicle interior while being connected to a chassis component. The stiffening struts 44, 46 are connected to each other at a point to form a V-shaped stiffening element. At the common connecting point, the stiffening struts 44, 46 are connected to the chassis component, which is preferably a subframe of the motor vehicle 10.

As a result, in the event of an impact of the motor vehicle 10, the impact energy can be conducted away in an oblique direction from the outer ends 30, 32 and can be transmitted to the chassis.

The impact plate 38 and the longitudinal struts 34, 36 can transmit impact energy from the vehicle end 24 to the traction battery 28 or to a battery housing 48 in which the traction battery 28 is accommodated. Therefore, the electric components of the electrically driven motor vehicle 10 achieve a reinforced block formation. The passive safety of the occupants can thereby be enhanced.

Figure 2:
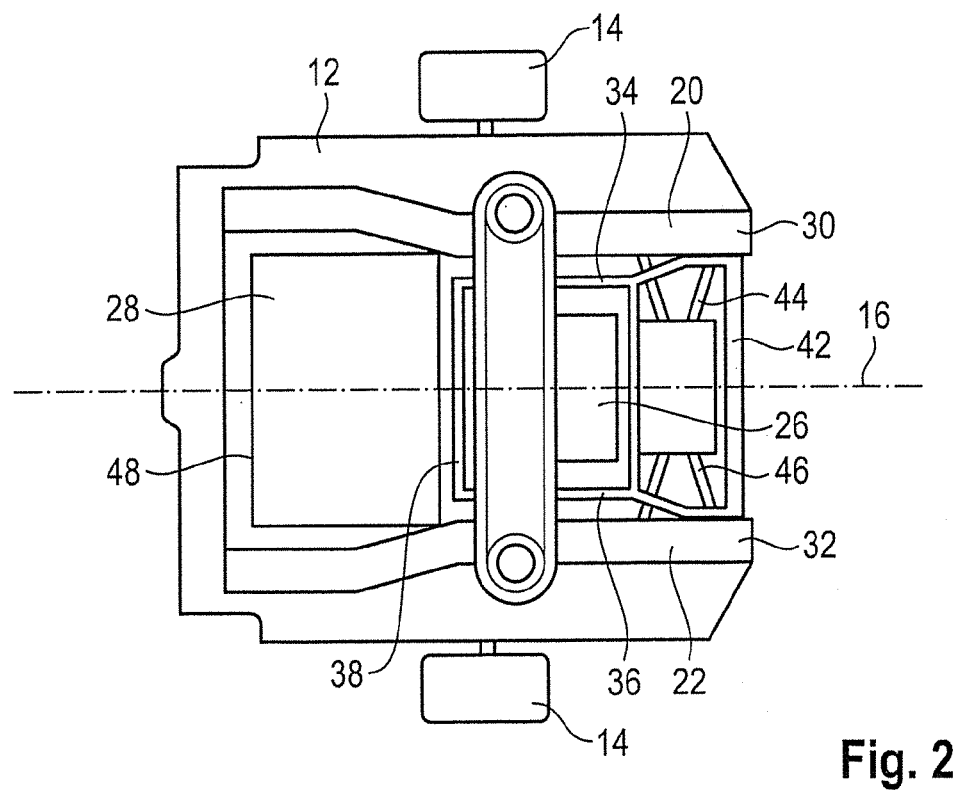
FIG. 2 is a schematic top view of the supporting frame.
Figure 3:
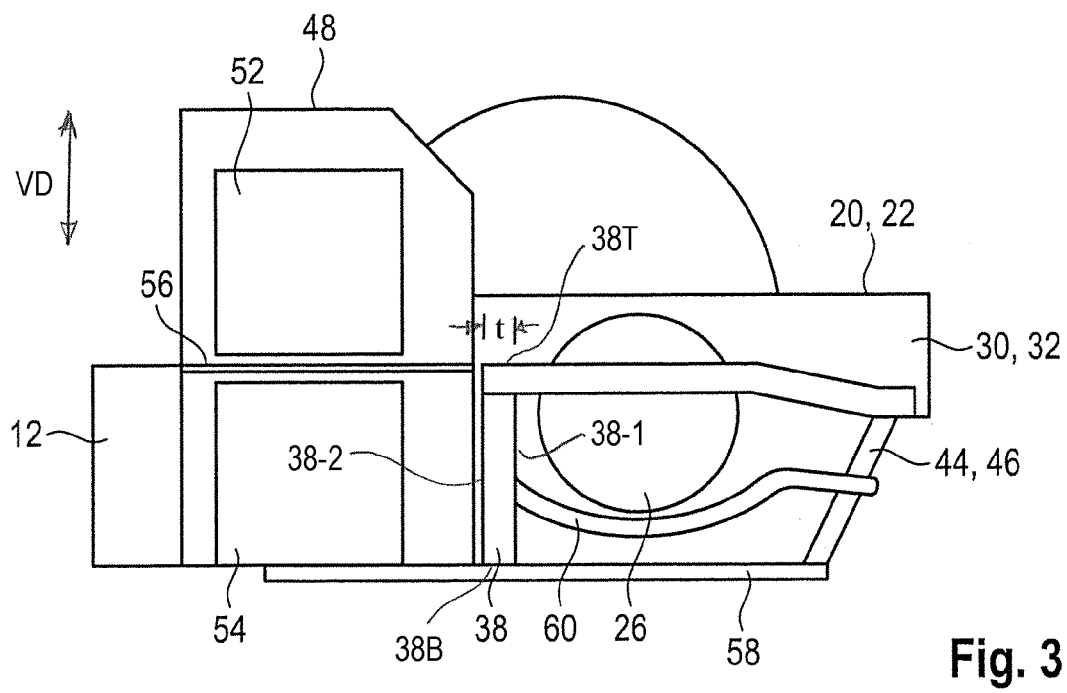
FIG. 3 is a schematic lateral cross-sectional view of the supporting frame.

FIG. 2 illustrates a detailed view of the supporting frame 12 in a top view. Identical elements are denoted by the same reference numbers, with only the special characteristics being explained here.

The longitudinal struts 34, 36 are arranged between the longitudinal members 20, 22 and at least partially run in the longitudinal direction 16 of the motor vehicle 10. The longitudinal struts 34, 36 are fixed to the longitudinal members 20, 22 at inner lateral sections of the outer ends 30, 32 of the longitudinal members 20, 22 to form a load path between the outer ends 30, 32 and the impact plate 38. The impact plate 38 is arranged in the longitudinal direction 16 between the traction battery 28 and the electric machine 26 so that impact energy of the motor vehicle 10 in the event of an impact is transmitted only to the traction battery 28. The electric machine 26 is assigned a control unit that is arranged in the longitudinal direction 16 in an outward direction upstream of the electric machine 26.

The stiffening struts 44, 46 run obliquely from the outer ends 30, 32 to a common connecting point on the subframe of the motor vehicle 10. The formation of a block with the traction battery 28 and the battery housing 48 can be reinforced by the overall structure, and therefore the rigidity of the supporting frame 12 is increased.

FIG. 3 schematically illustrates a detailed view of the supporting frame 12 in a lateral sectional view. Identical elements are denoted by the same reference numbers, with only the special characteristics being explained here.

The supporting frame 12 has the longitudinal members 20, 22 which extend in the longitudinal direction 16. The electric machine 26 is mounted on the longitudinal members 20, 22, wherein the longitudinal struts 34, 36 connect the outer ends 30, 32 to the impact plate 38.

The traction battery 28 is formed by a first battery module 52 and a second battery module 54 that are arranged one above the other in the battery housing 48 and are separated from each other by a stiffening element 56. The stiffening element 56 is a horizontal intermediate plane 56 in the housing 48 and connects the opposite housing parts of the battery housing 48. As a result, in the event of an impact, the impact energy or the deformation energy can be transmitted by the longitudinal struts 34, 36 via the impact plate 38 to the horizontal intermediate plane 56 which forms a rigid connection between the two opposite housing parts of the battery housing 48. This makes it possible to increase the formation of a block between the longitudinal members 22, 24 and the supporting frame 12 or the body 12 of the motor vehicle 10.

The stiffening struts 44, 46 run obliquely down from the outer ends 30, 32 and are connected at a common point to the subframe 58 or other chassis component.

FIG. 3 illustrates a further longitudinal member 60 that connects the stiffening struts 44, 46 to the impact plate 38 to ensure a further increase in the stability of the supporting frame 12.

Overall, in the event of an impact of the motor vehicle 10, stability failures due to buckling of the longitudinal members can be avoided or delayed. Additionally, the impact energy can be transmitted gently by the flat impact plate 38 to the traction battery 28, and therefore the driving machine 26 is relieved of load in the event of an impact. The stability of the battery housing 48 is increased here by the stiffening element 26. Furthermore, the stability is increased by the stiffening struts 44, 46 that are connected in a V-shape to ensure an oblique load path in the supporting frame 12.

What is claimed is:

1. A supporting frame for a motor vehicle, the motor vehicle having opposite first and second longitudinal ends spaced apart along a longitudinal direction of the motor vehicle, an electric driving unit in proximity to the first longitudinal end and a traction battery between the electric driving unit and the second longitudinal end, the supporting frame comprising:
   first and second parallel longitudinal members oriented in the longitudinal direction of the motor vehicle and forming part of a body of the motor vehicle, each of the first and second longitudinal members having an end in proximity to the first longitudinal end of the motor vehicle;
   first and second longitudinal struts at least partially oriented in the longitudinal direction and each having a first end fixed to a contact section of the first or second longitudinal members at the end of the respective longitudinal member, each of the first and second longitudinal struts further having a second end opposite the first end;
   an impact plate opposed to and substantially adjacent the traction battery of the motor vehicle and between the traction battery and the electric driving unit, the impact plate being connected to the second ends of the longitudinal struts to form a load path between the respective contact sections of the longitudinal members and the traction battery, the impact plate having a plurality of side edges and opposite front and rear surfaces inward of the side edges, each of the front and rear surfaces defining an area substantially larger than an area defined by any of the side edges, the front and rear surfaces of the impact plate extending substantially perpendicular to the longitudinal direction so that impact energy in an event of a collision is transmitted via the longitudinal struts and the impact plate to the traction battery, thereby stiffening the motor vehicle at locations in proximity to the first end of the motor vehicle.

2. The supporting frame of claim 1, further comprising at least one cross member that extends obliquely or perpendicularly to the longitudinal direction and connects the first and second longitudinal struts.

3. A supporting frame for a motor vehicle, the motor vehicle having an electric driving unit and a traction battery, the supporting frame comprising:
   first and second parallel longitudinal members oriented in a longitudinal direction of the motor vehicle and forming part of a body of the motor vehicle, each of the first and second longitudinal members having an end in proximity to a front or rear end of the motor vehicle;
   first and second longitudinal struts at least partially oriented in the longitudinal direction and each having a first end fixed to a contact section of the first or second longitudinal members at the end of the respective longitudinal member, each of the first and second longitudinal struts further having a second end opposite the first end;
   an impact plate opposed to and substantially adjacent the traction battery of the motor vehicle at a position between the traction battery and the electric driving unit, the impact plate having a plurality of side edges and opposite front and rear surfaces inward of the side edges, each of the front and rear surfaces defining an area substantially larger than an area defined by any of the side edges, the front and rear surfaces of the impact plate extending substantially perpendicular to the longitudinal direction, the second end of each of the longitudinal struts has a rib structure supported on the impact plate to form a load path between the respective contact sections of the longitudinal members and the traction battery.

4. The supporting frame of claim 1 wherein the traction battery is accommodated in a battery housing that is fixed to the vehicle body.

5. The supporting frame of claim 4, wherein the impact plate is supported opposed to and substantially adjacent the battery housing.

6. The supporting frame of claim 1 wherein the traction battery has a plurality of battery modules, and a stiffening element being arranged between the battery modules and extending in the longitudinal direction.

7. The supporting frame of claim 6, wherein the stiffening element is a horizontally formed intermediate plane in the battery housing.

8. The supporting frame of claim 1, further comprising two stiffening struts connected to the longitudinal members and to a subframe of the motor vehicle and extending obliquely with respect to the longitudinal direction.

9. The supporting frame for a motor vehicle, the motor vehicle having an electric driving unit and a traction battery, the supporting frame comprising:
- first and second parallel longitudinal members oriented in a longitudinal direction of the motor vehicle and forming part of a body of the motor vehicle, each of the first and second longitudinal members having an end in proximity to a front or rear end of the motor vehicle;
- first and second longitudinal struts at least partially oriented in the longitudinal direction and each having a first end fixed to a contact section of the first or second longitudinal members at the end of the respective longitudinal member, each of the first and second longitudinal struts further having a second end opposite the first end;
- an impact plate opposed to and substantially adjacent the traction battery of the motor vehicle at a position between the traction battery and the electric driving unit, the impact plate having a plurality of side edges and opposite front and rear surfaces inward of the side edges, each of the front and rear surfaces defining an area substantially larger than an area defined by any of the side edges, the front and rear surfaces of the impact plate extending substantially perpendicular to the longitudinal direction; and
- two stiffening struts having first ends fixed to the first ends of the longitudinal members and second ends converging toward one another and connected to each other in a V-shaped manner and the stiffening struts being fixed at a common contact point to a section of a subframe, the longitudinal struts form a first load path between the respective contact sections of the longitudinal members and the traction battery and the stiffening struts form a second load path between the first ends of the longitudinal members and the subframe.

10. The supporting frame of claim 9, wherein the stiffening struts form a V-shaped stiffening element that is open in the longitudinal direction toward the first ends of the longitudinal members.

11. A motor vehicle comprising the supporting frame of claim 1, the motor vehicle having no internal combustion engine and the electric driving unit providing driving power for the motor vehicle and the traction battery providing electric energy for the electric driving unit.

12. The supporting frame of claim 9, wherein the subframe extends from the second ends of the stiffening struts to a lower end of the impact plate.

13. The supporting frame of claim 12, further comprising at least one additional longitudinal member connecting an intermediate location on each of the stiffening struts to an intermediate location on one of the surfaces of the impact plate opposed to the stiffening struts.

* * * * *